United States Patent
Epis et al.

(10) Patent No.: US 10,267,183 B2
(45) Date of Patent: Apr. 23, 2019

(54) SYSTEM, METHOD AND APPARATUS FOR MINIMIZING HEAT LOSS IN A HEAT RECOVERY STEAM GENERATOR

(71) Applicant: General Electric Technology GmbH, Baden (CH)

(72) Inventors: Glauco Epis, Villasanta (IT); Luca Angelo Cinquegrani, Milano (FR); Luca Rigoni, Rigoni (IT)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 179 days.

(21) Appl. No.: 15/409,578

(22) Filed: Jan. 19, 2017

(65) Prior Publication Data

US 2017/0211426 A1  Jul. 27, 2017

(30) Foreign Application Priority Data

Jan. 27, 2016  (EP) ..................................... 16425004

(51) Int. Cl.
*F01K 13/02* (2006.01)
*F01K 23/10* (2006.01)
(Continued)

(52) U.S. Cl.
CPC .............. *F01K 13/02* (2013.01); *F01K 23/10* (2013.01); *F01N 5/02* (2013.01); *F16K 7/10* (2013.01); *F22B 1/1815* (2013.01); *F22B 37/06* (2013.01); *F01N 2260/08* (2013.01); *F01N 2260/10* (2013.01); *F01N 2590/10* (2013.01); *F02G 5/02* (2013.01); *F16L 55/134* (2013.01);
(Continued)

(58) Field of Classification Search
CPC ......... F16L 55/134; F16L 55/128; F16K 7/10; F16K 7/17; Y10T 137/0475; Y10T 137/6123
USPC .............................................. 138/89, 93, 97
See application file for complete search history.

(56) References Cited

U.S. PATENT DOCUMENTS 1,860,855 A * 5/1932 Gardner .................... F16K 7/10
138/93
1,946,138 A * 2/1934 Gardner .................... F16K 7/10
138/93
(Continued)

FOREIGN PATENT DOCUMENTS

DE    200 20 636 U1    2/2001
FR    2 648 539 A2    12/1990
(Continued)

OTHER PUBLICATIONS

Extended European Search Report and Opinion issued in connection with corresponding EP Application No. 16425004.5 dated Aug. 3, 2016.

*Primary Examiner* — Patrick F Brinson
(74) *Attorney, Agent, or Firm* — GE Global Patent Operation; Stephen G. Midgley

(57) ABSTRACT

A damper assembly for minimizing heat loss through an exhaust includes a housing mounted within the stack and a bladder received within the housing. The bladder is selectively movable between a first position in which the bladder is deflated and received within the housing, and second position in which the bladder is positioned outside the housing and inflated such that a peripheral surface of the bladder contacts an interior sidewall of the stack to create a gas seal.

17 Claims, 13 Drawing Sheets

(51) Int. Cl.
   *F16K 7/10*     (2006.01)
   *F01N 5/02*     (2006.01)
   *F22B 1/18*     (2006.01)
   *F22B 37/06*    (2006.01)
   *F16L 55/134*   (2006.01)
   *F02G 5/02*     (2006.01)

(52) U.S. Cl.
   CPC .............. *Y02E 20/14* (2013.01); *Y02E 20/16* (2013.01); *Y02T 10/16* (2013.01)

(56) References Cited

U.S. PATENT DOCUMENTS

| | | | | |
|---|---|---|---|---|
| 2,487,991 | A * | 11/1949 | Stephens | F16L 55/132 138/90 |
| 3,842,864 | A * | 10/1974 | Riegel | F16K 7/10 138/93 |
| 4,029,128 | A * | 6/1977 | Yamagishi | E02D 15/04 138/89 |
| 4,155,373 | A * | 5/1979 | DiGiovanni | F16K 7/10 137/15.15 |
| 4,625,766 | A * | 12/1986 | Dohlen | F16L 55/18 138/93 |
| 5,015,828 | A * | 5/1991 | Ritz | C21D 9/08 148/519 |
| 5,285,806 | A * | 2/1994 | Ortega | F16L 55/124 137/15.15 |
| 5,400,826 | A * | 3/1995 | Clough | F16L 55/124 138/89 |
| 5,524,661 | A * | 6/1996 | Tigerholm | F16L 55/12 137/15.15 |
| 7,886,773 | B2 * | 2/2011 | Mainzer | F16K 7/10 137/15.15 |
| 9,447,889 | B2 * | 9/2016 | Al Shammary | F16L 55/124 |

FOREIGN PATENT DOCUMENTS

| | | |
|---|---|---|
| GB | 2 331 796 A | 6/1999 |
| GB | 2 435 901 A | 9/2007 |
| JP | 3167252 B2 | 5/2001 |

* cited by examiner

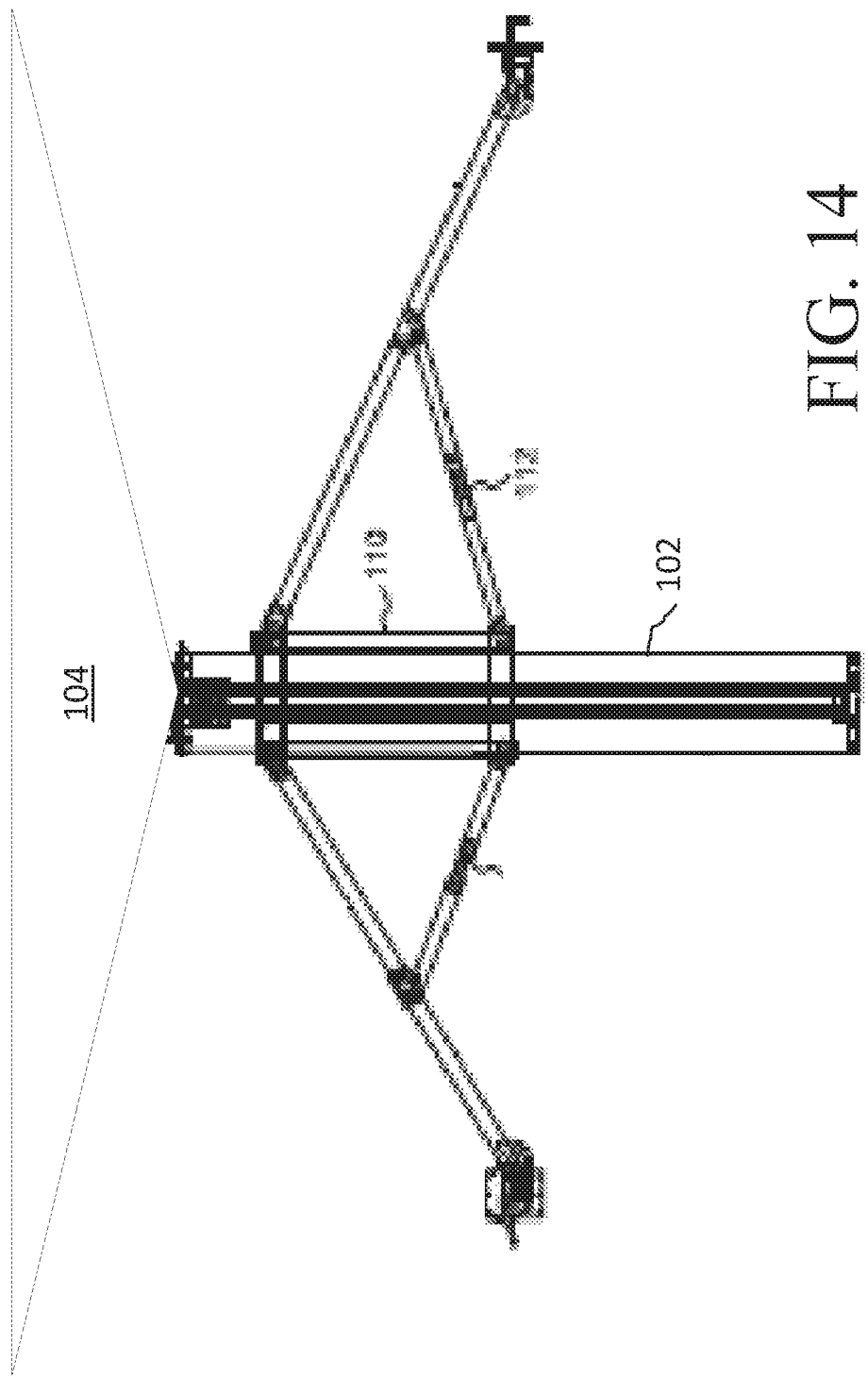

SYSTEM, METHOD AND APPARATUS FOR MINIMIZING HEAT LOSS IN A HEAT RECOVERY STEAM GENERATOR

BACKGROUND

Technical Field

Embodiments of the invention relate generally to power generation and, more particularly, to an apparatus for mitigating heat loss through the stack of a heat recovery steam generator during outage periods.

Discussion of Art

Gas turbines have been widely used to provide electric power, usually as a standby for both peak power and reserve power requirements in the utility industry. Gas turbines are preferred because of their rapid starting capability and low capital cost. Conventional gas turbines, however, operate with reduced thermal efficiency due to the high exit temperatures of the exhaust gas stream and the resulting thermal loss. Therefore, a gas turbine is often combined with a heat recovery steam generator to improve overall system efficiency.

As is known in the art, heat recovery steam generators can be employed to drive a steam turbine for power output, such as in a combined cycle power plant, or to provide process steam in cogeneration cycles. For example, flue gas discharged by the gas turbine may be conducted through a heat recovery steam generator for the generation of steam and then discharged to atmosphere through a stack.

During outage periods of a power plant, such as during night or weekend shutdowns, heat may be lost from the heat recovery steam generator through the stack due to natural draft. This heat loss through the stack also results in a decrease in pressure within the boiler drums of the heat recovery steam generator that must be recovered during the following start up, which increases the fuel cost and the time required to bring the plant back online and operating at full capacity.

In addition to the increase in fuel cost and time required to transition the plant back to full capacity after a shut down, frequent shut down and start up can contribute to cyclical stresses in the components of the heat recovery steam generator. In particular, cyclical stresses may result from changes in the temperature of components as the plant is shut-down and re-started. Because of the high stream pressures involved, many of the components are thick-walled so the temperature changes do not occur evenly across the components. This results in differing rates of thermal expansion and contraction across the component and high material stresses.

Existing strategies to reduce thermal stresses during shut down and subsequent re-start include the use of metallic dampers within the stack that can be selectively closed during shutdown. Such dampers help to prevent heat loss from the heat recovery steam generator through the stack during shut down periods, thereby reducing the magnitude of temperature changes and thus thermal stresses within the components of the heat recovery steam generator, as well as decreasing the time required and amount of fuel needed to bring the plant back up to full capacity. Many building and safety codes, however, prevent such metallic stack dampers from being retrofit into existing heat recovery steam generator stacks due to the immense weight of such dampers. Indeed, retrofitting of such dampers may often require a complete redesign of the stack and/or foundations to accommodate the stack damper weight.

In view of the above, there is a need for system, method and apparatus for quickly and easily sealing off the stack of a heat recovery steam generator to avoid natural draft during shut down periods of a power plant, and which system and apparatus may be retrofit into existing heat recovery steam generator stacks without requiring significant modifications to the stack or foundation.

BRIEF DESCRIPTION

In an embodiment, a damper assembly for minimizing heat loss through an exhaust stack is provided. The damper assembly includes a housing mountable within the stack and a bladder received within the housing. The bladder is selectively movable between a first position in which the bladder is deflated and received within the housing, and second position in which the bladder is positioned outside the housing and inflated such that a peripheral surface of the bladder contacts an interior sidewall of the stack to create a gas seal.

In another embodiment, a damper assembly for minimizing heat loss through a stack of a heat recovery steam generator is provided. The damper assembly includes a housing positioned concentrically within the stack, and an inflatable bladder movable between a first position in which the bladder is received within the housing and a second position in which the bladder is extended from the housing.

In yet another embodiment, a method for minimizing heat loss through an exhaust stack is provided. The method includes the steps of mounting a damper assembly within the exhaust stack, the damper assembly having a housing and a bladder within the housing, upon entering a shutdown mode, inflating the bladder to establish a gas seal between the bladder and an interior sidewall of the exhaust stack, and upon entering a restart mode, deflating the bladder to enable exhaust gas to pass by the damper assembly within the stack and exit the stack.

DRAWINGS

The present invention will be better understood from reading the following description of non-limiting embodiments, with reference to the attached drawings, wherein below:

FIG. 14 is a side elevational view of an embodiment having a conical-shaped bladder 104.

DETAILED DESCRIPTION

Figure 1:
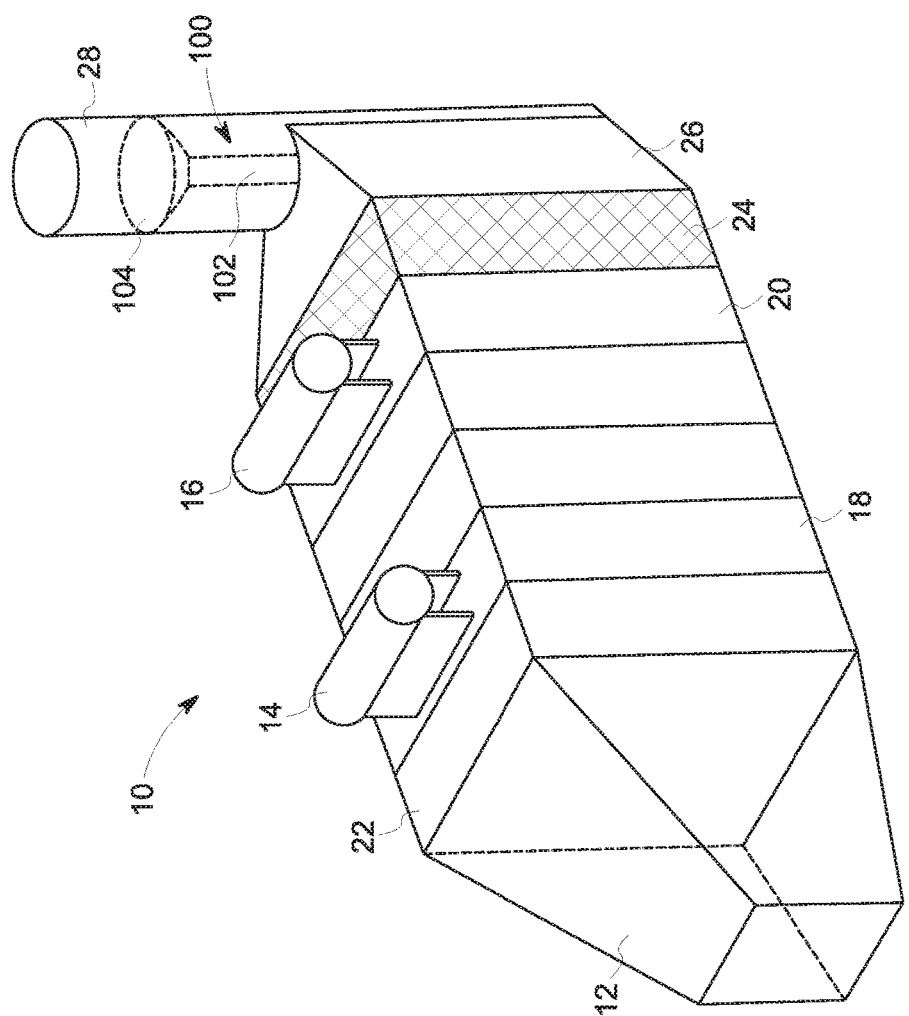
FIG. 1 is a schematic illustration of a heat recovery steam generator having a stack damper according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in the exhaust stack of a heat recovery steam generator of a combined cycle or cogeneration power plant, embodiments of the invention may also be applicable for use in other types of ducts in such power plants, such as in a heat recovery steam generator bypass duct, and in ducts, generally. For example, embodiments of the invention may also be suitable for use in any duct in which selective closing off and opening of the duct is desired to constrain or facilitate the flow of a gaseous or liquid fluid therethrough.

As used herein, "electrical communication" or "electrically coupled" means that certain components are configured to communicate with one another through direct or indirect signaling by way of direct or indirect electrical connections. As used herein, "operatively coupled" refers to a connection, which may be direct or indirect. The connection is not necessarily a mechanical attachment. As used herein, "communication" means that two or more components are connected in such a manner to allow for the propagation of signals between such components, such as, but not limited to, through wires/cables, fiber optics, and wireless transmitters/receivers.

Embodiments of the invention relate to a system, method and apparatus for minimizing heat loss from a heat recovery steam generator during shut down periods. FIG. 1 illustrates an exemplary heat recovery steam generator ("HRSG") 10 in which the system and apparatus of the invention may be deployed. The HRSG 10 has an inlet plenum 12 which is supplied with combustion gas from an exhaust duct of a gas turbine (not shown) which powers a generator (not shown). HRSG 10 is of known design and includes, for example, a high pressure drum 14, a low pressure drum 16, and associated heat exchanger surfaces including high and low pressure evaporators 18, 20, respectively, superheater 22, and economizer 24 surfaces in a conventional manner. After passing through the heat exchangers, the exhaust gases are directed through a transition piece 26 and are emitted to atmosphere via stack 28, as is known in the art. Other configurations of the HRSG are also possible.

Figure 2:
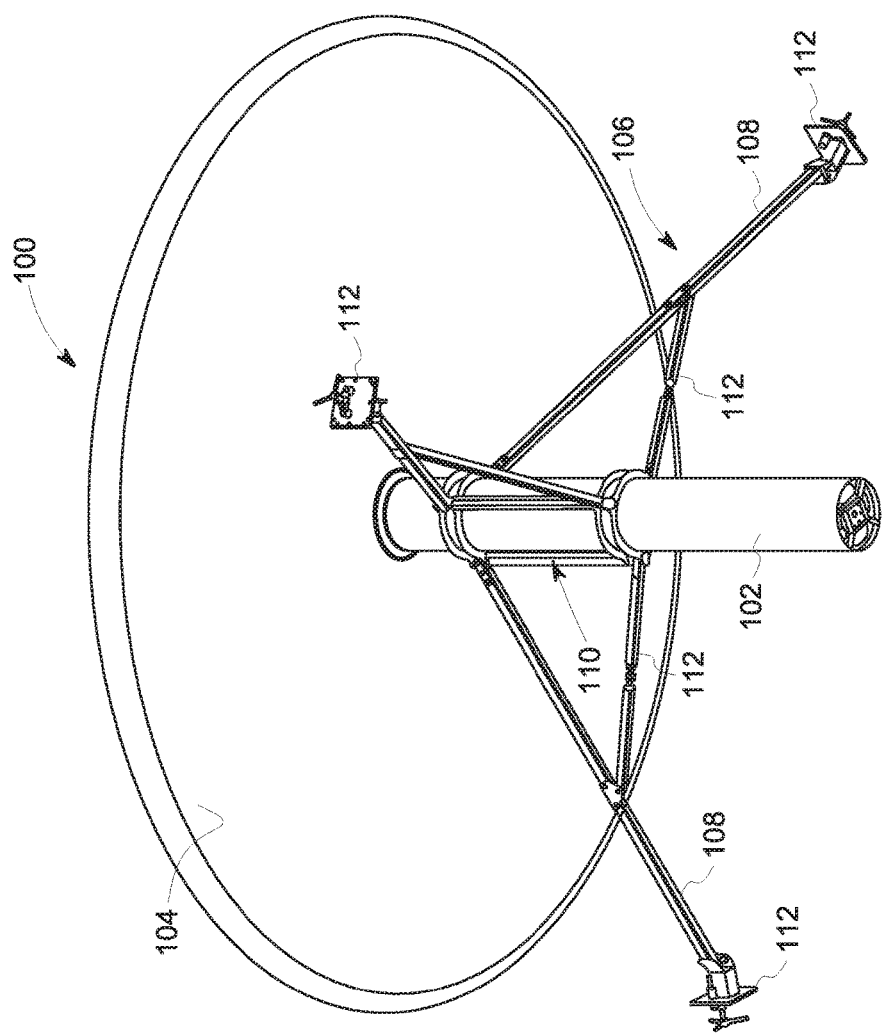
FIG. 2 is a perspective view of the stack damper according to an embodiment of the present invention.
Figure 3:
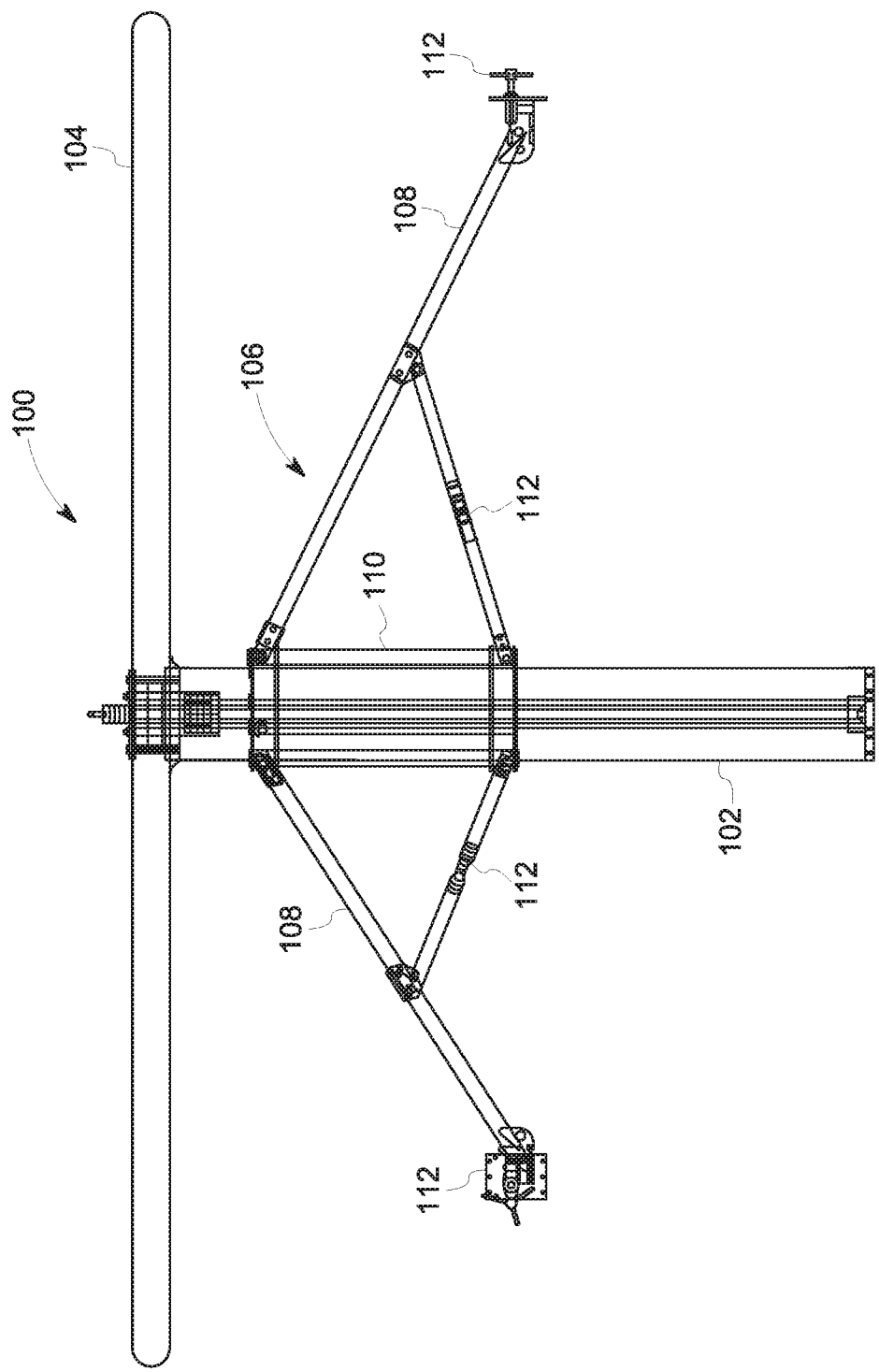
FIG. 3 is a side elevational view of the stack damper of FIG. 2.
Figure 4:
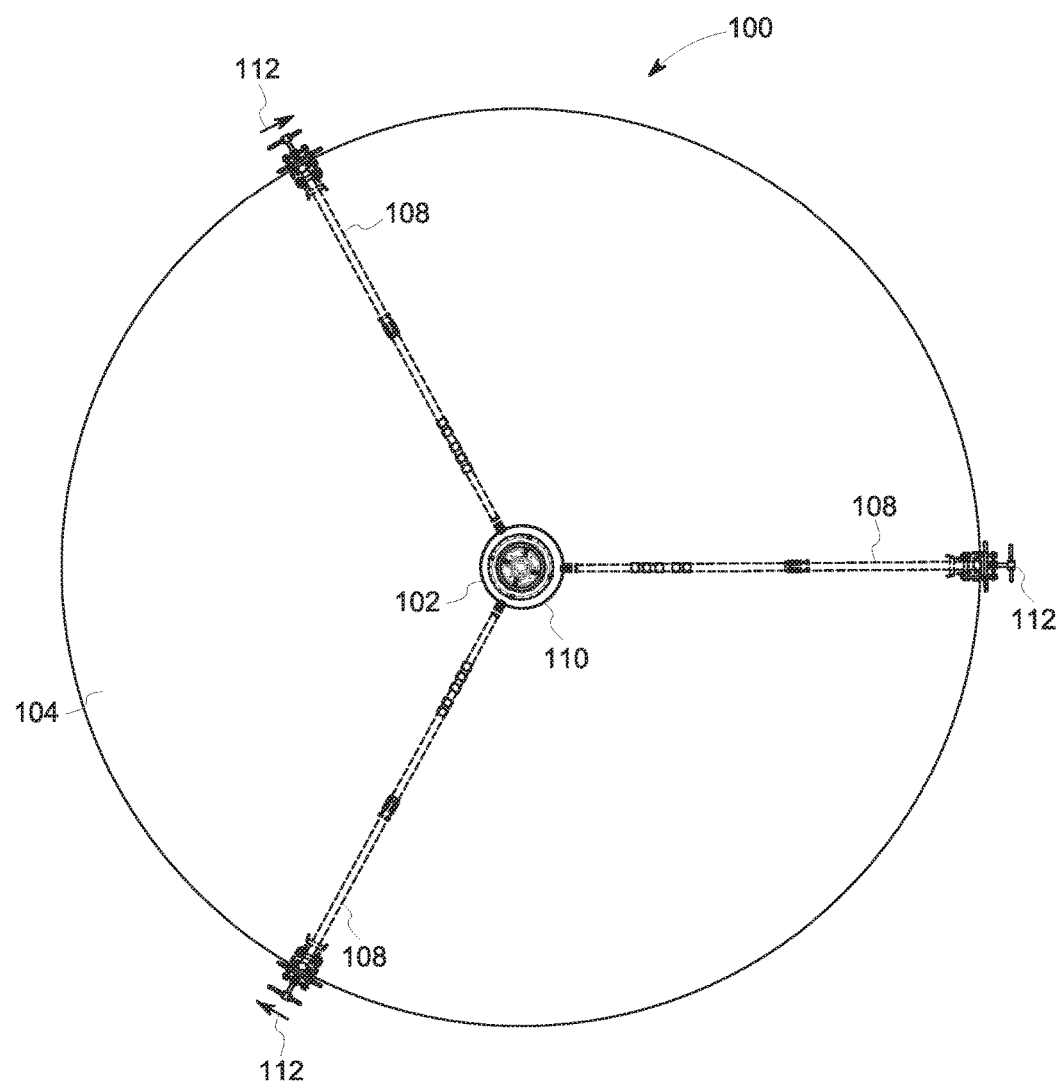
FIG. 4 is a bottom plan view of the stack damper of FIG. 2.
Figure 5:
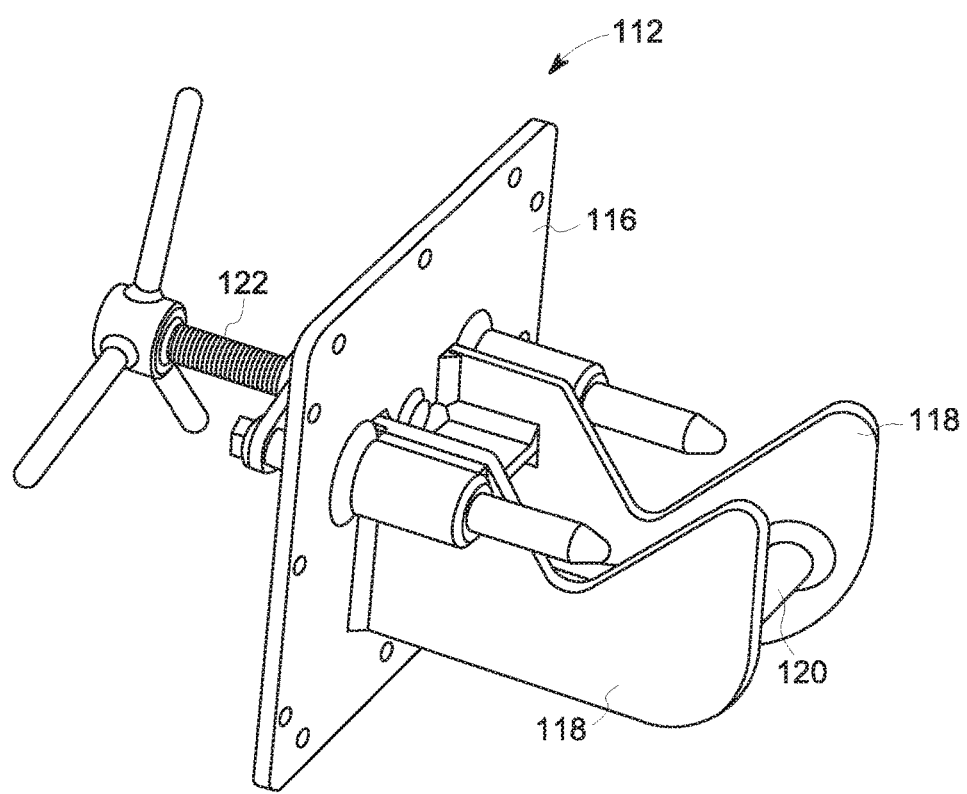
FIG. 5 is a perspective view of a mounting bracket of the stack damper of FIG. 2.
Figure 6:
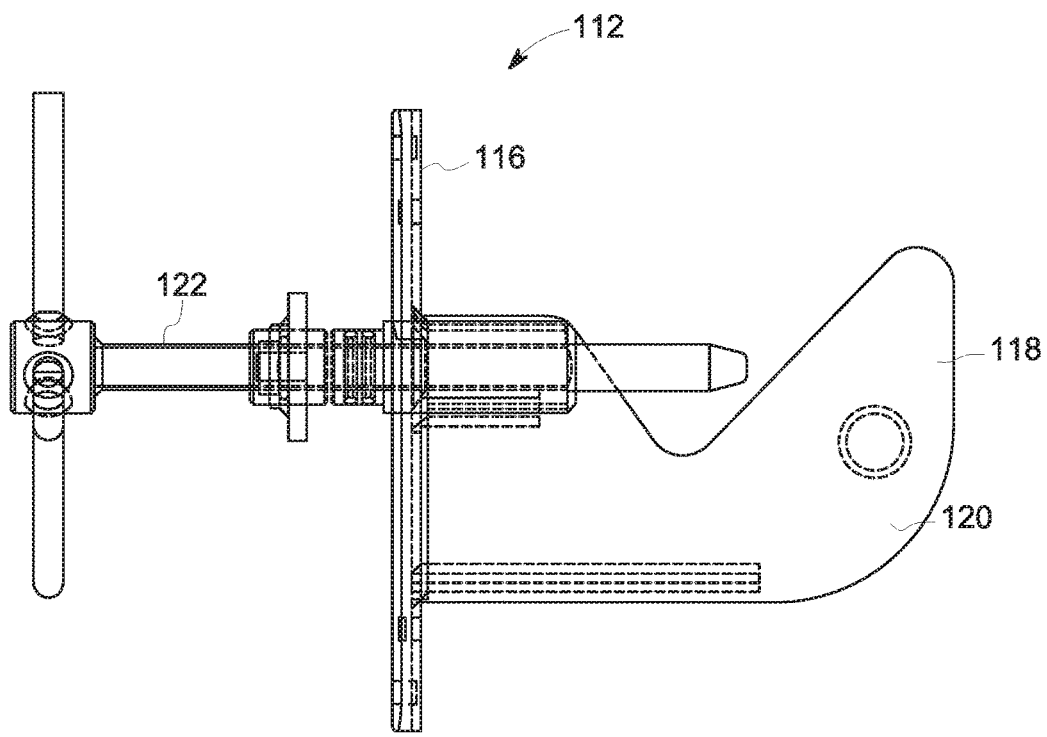
FIG. 6 is a side elevational view of the mounting bracket of FIG. 5.
Figure 7:
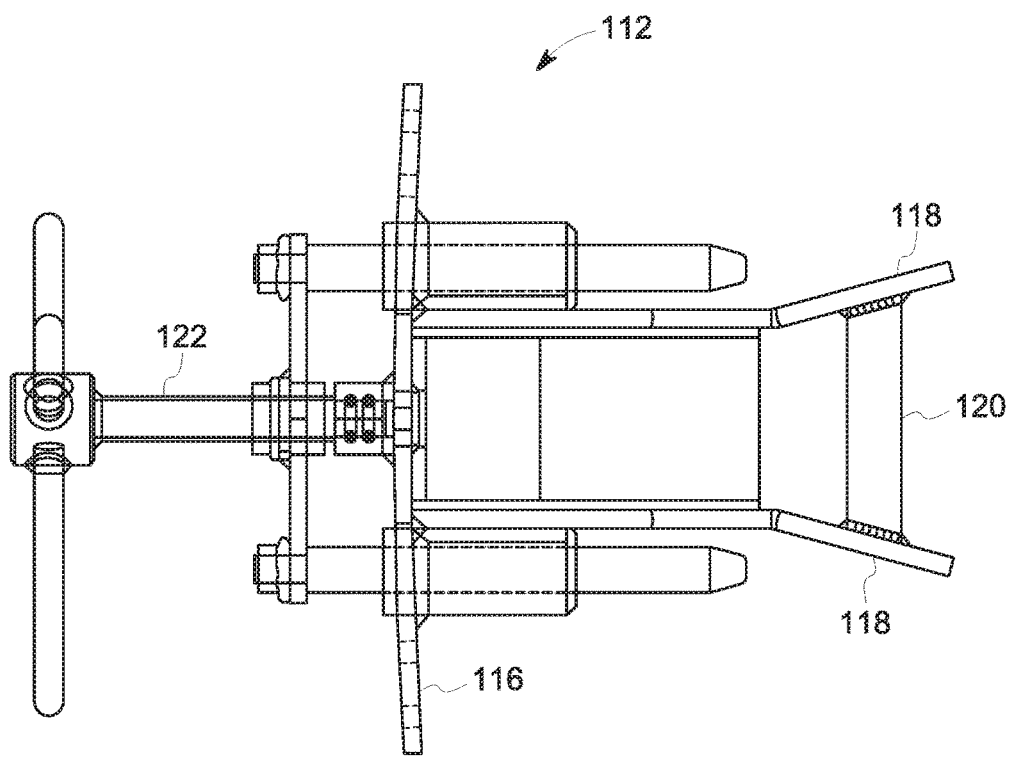
FIG. 7 is a top plan view of the mounting bracket of FIG. 5.
Figure 8:
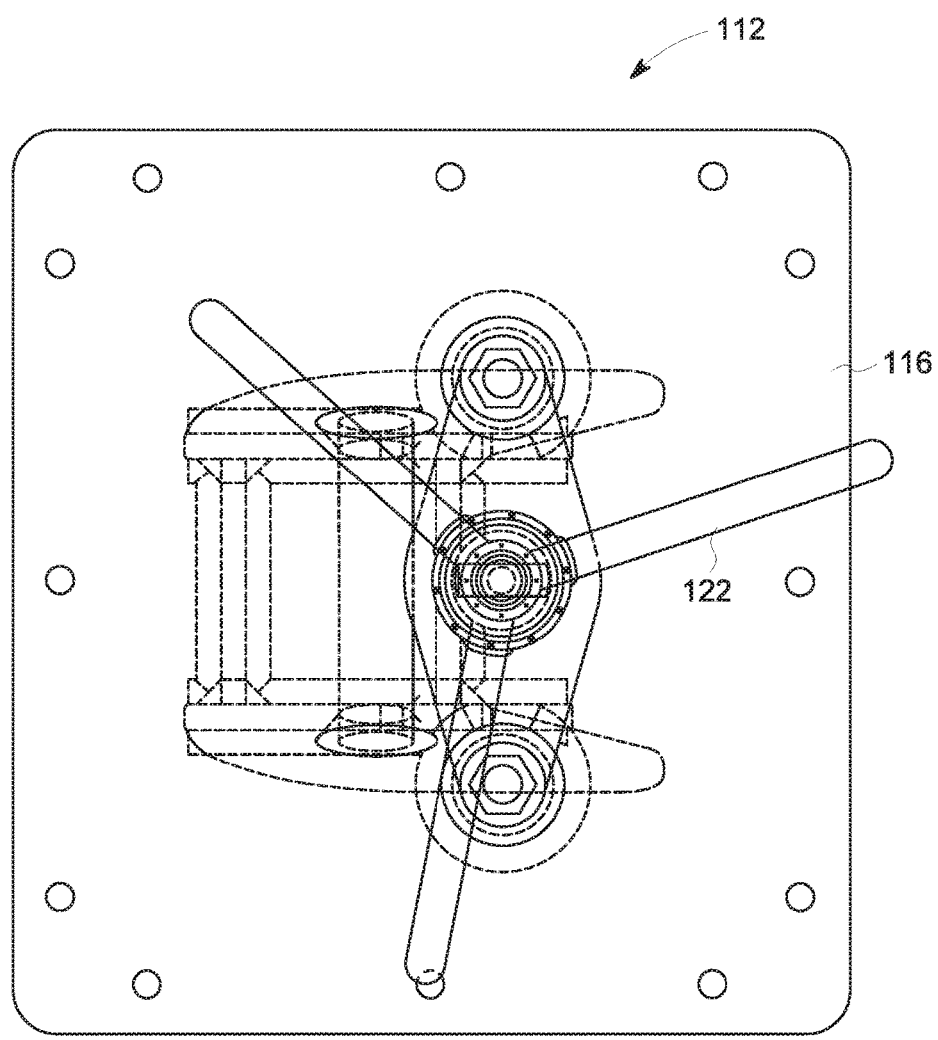
FIG. 8 is a rear elevational view of the mounting bracket of FIG. 5.
Figure 9:
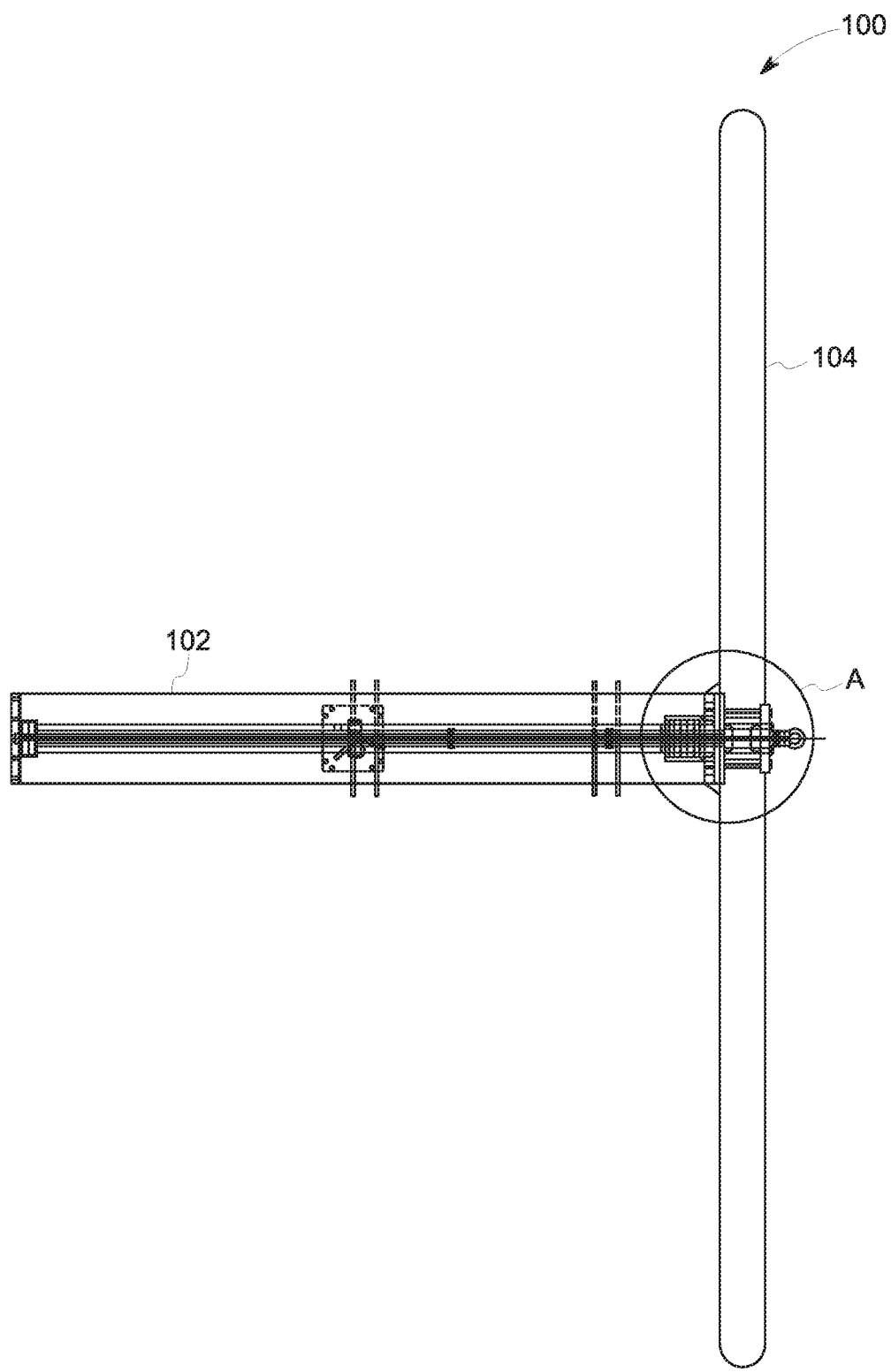
FIG. 9 is a side elevational view of the stack damper of FIG. 2, shown with the support legs removed.

As further illustrated in FIG. 1, in accordance with an embodiment of the invention, a damper assembly 100 is mounted within the stack 28 and is operable to selectively close off the stack 28 to minimize heat loss from the HRSG 10 during shut down periods, as discussed in detail hereinafter. Referring now to FIGS. 2-4, the damper assembly 100 includes a generally cylindrical conduit or housing 102 configured to receive an inflatable bladder or balloon 104 therein. The conduit 102 is positioned generally concentrically within the stack 28 and is supported therein by a tripod-like mounting assembly 106. As shown in FIGS. 2-4, the mounting assembly 106 includes a plurality of supporting legs 108 pivotally connected at one end to the conduit 102 via a generally cylindrical frame 110 surrounding the conduit 102, and at their respective opposite ends to the inner walls of the stack 28 via mounting brackets 112. The assembly 106 also includes a plurality of struts 114 associated with each leg 108. The struts 114 include an adjustment mechanism which allows the length of the struts 114 to be adjusted.

FIGS. 5-8 illustrated an exemplary configuration of the mounting brackets 112 which enable mounting of the damper assembly 100 to the interior sidewalls of the stack 28, as discussed hereinafter. As shown therein, the mounting brackets 112 include a generally planar base plate 116 from which a pair of opposed tines 118 extend. The tines 118 are joined by a rod 120. The rod 120 is designed so as to be received by a hook portion formed on the end of the legs 108 to enable coupling of the legs 108 to a respective mounting bracket 112. A tightening screw 122 is provided on an opposing side of the base plate 116 which enables the mounting bracket 112 to be fixedly secured to the stack 28.

With the bladder 104 in its deflated state, the damper assembly 100 may be installed within the stack 28 utilizing the mounting assembly 106. In particular, the damper assembly 100 may be lowered into the stack 28 and secured to the sidewalls of the stack utilizing the mounting brackets 112. The pivoting configuration of the legs 108, in combination with the adjustable struts 114, allows the legs 108 to be pivoted upwardly or downwardly until the base plate 116 of each mounting bracket 112 contacts the interior sidewalls of the stack 28, at which point the tightening screw 122 may be utilized to fixedly secure the mounting bracket 112 to the sidewall. This provides for a rigid connection between the conduit 102 and the sidewalls of the stack 28, while the struts 114 provide bolstering support for the legs 108 and help bear the weight of the assembly 100.

With further reference to FIGS. 1-4, the size and shape of the bladder 104, when inflated, corresponds to the size and shape of the passageway defined by the inner walls of the stack 28 of the HRSG 10. In an embodiment, the bladder 104 is substantially disc shaped when inflated, as best illustrated in FIGS. 2 and 3. In another embodiment, the bladder 104 is substantially cone shaped when inflated, although other shapes are also possible without departing from the broader aspects of the present invention. In any event, the diameter of the bladder 104, when inflated, closely matches the inside diameter of the stack 28 or other passageway in which the damper assembly 100 is deployed. In an embodiment, the bladder 104 is manufactured from a material capable of withstanding temperatures in excess of approximately 250° C. and which exhibits a high enough wear resistance to enable use at least once per day (the wear resistance being necessary to withstand repeated contact with the internal sidewalls of the stack 28). In an embodiment, the bladder 104 is manufactured from a material having a wear resistance capable of withstanding twice a day use (i.e., inflation and deflation) without substantial degradation. For example, in an embodiment, the bladder 104 may be formed from fiberglass with a double protective layer (i.e., on its internal and external surface) of silicon, and Kevlar® stitching.

Figure 10:
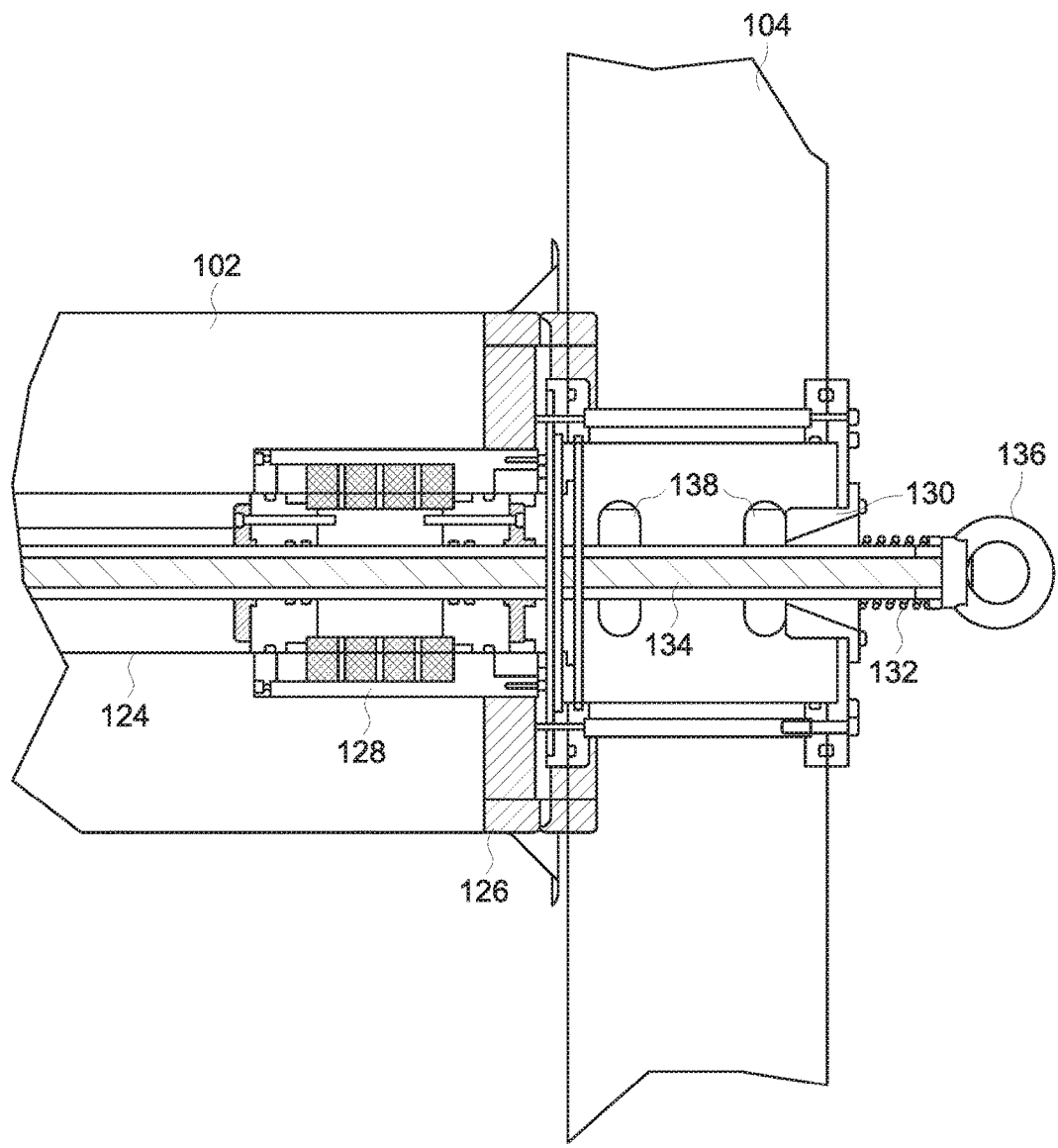
FIG. 10 is an enlarged view of area A of FIG. 9.
Figure 11:
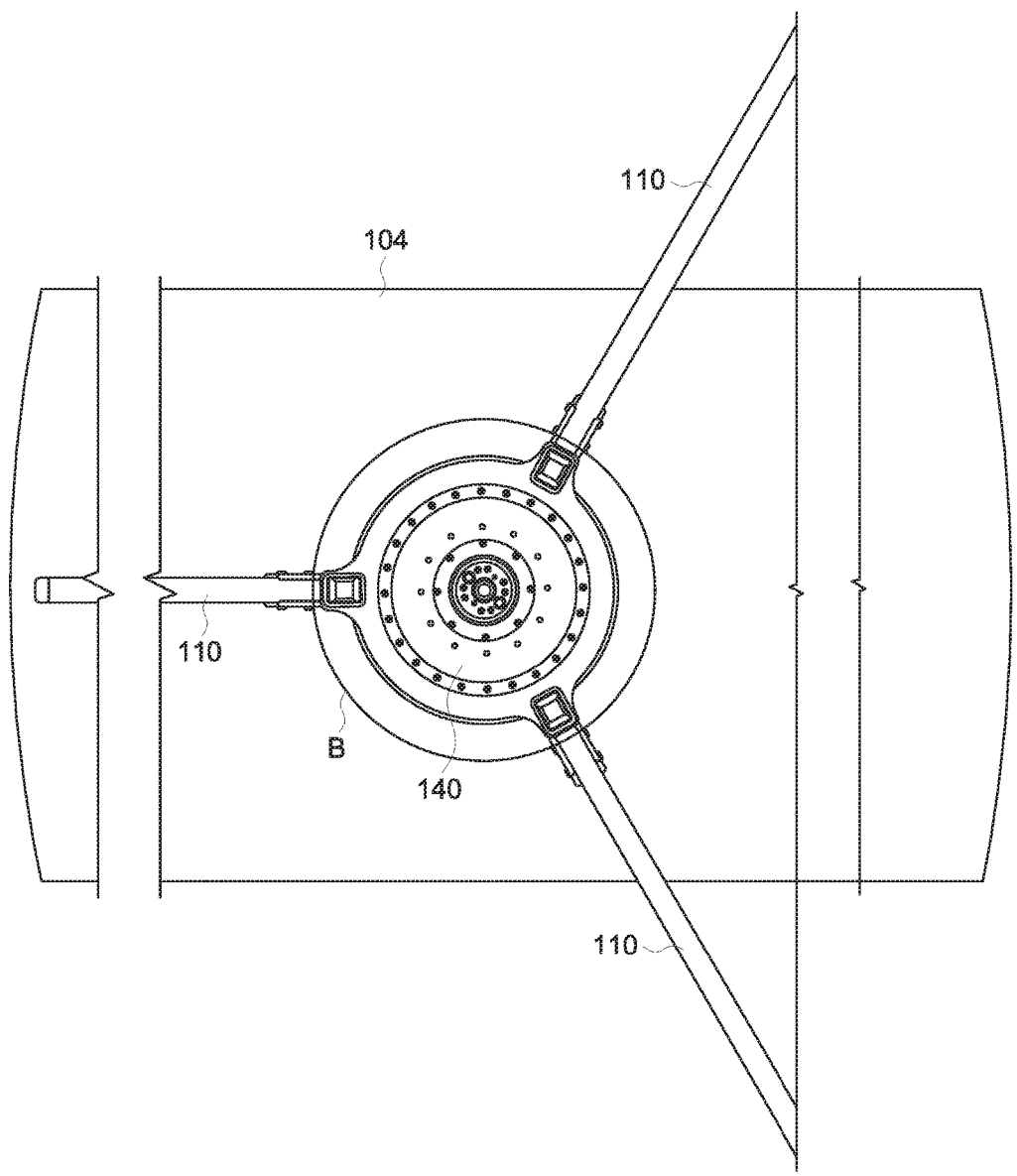
FIG. 11 is an enlarged, detail view of the bottom of the stack damper.
Figure 12:
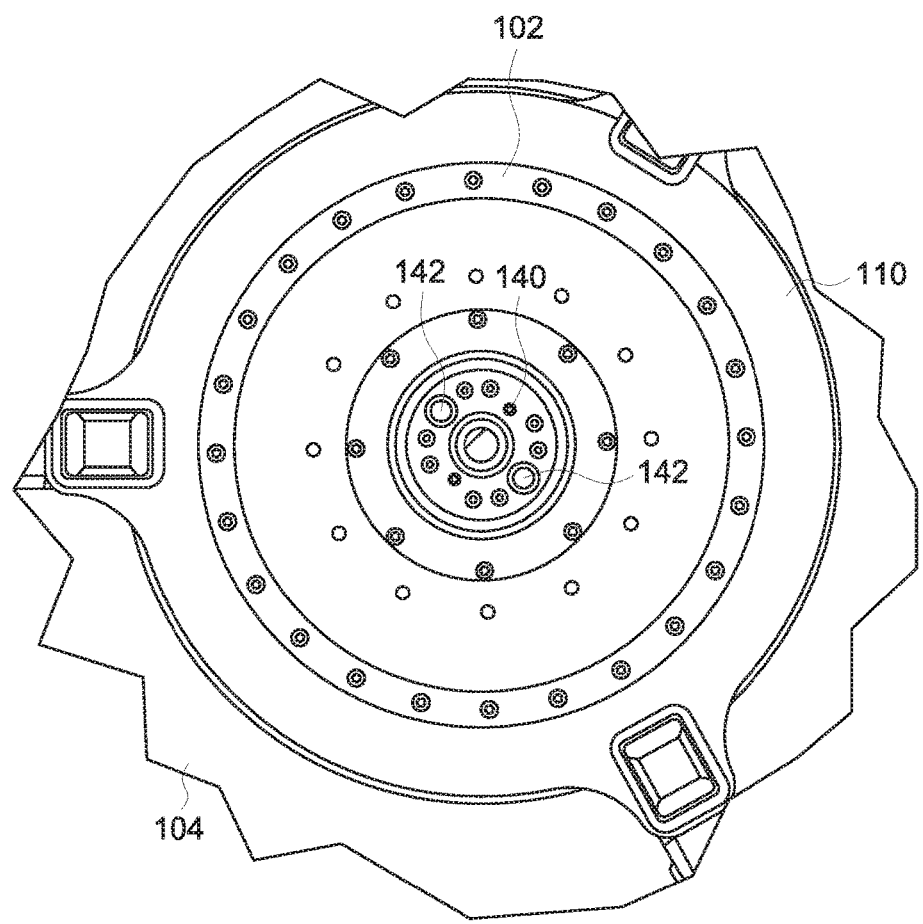
FIG. 12 is an enlarged view of area B of FIG. 11.
Figure 13:
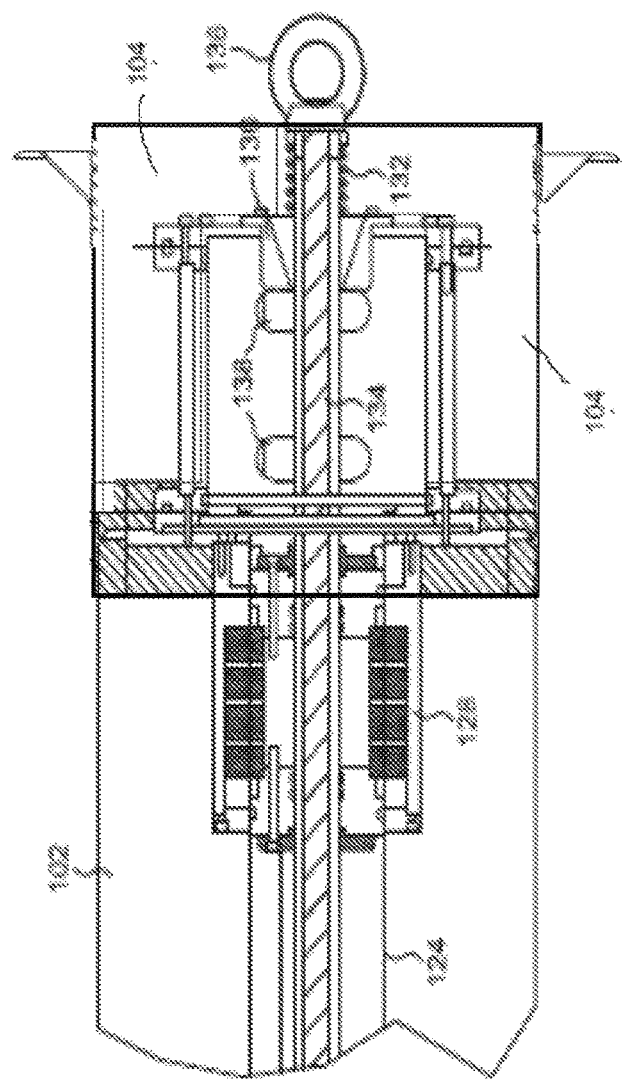
FIG. 13 is a side elevational view of an embodiment, shown with the bladder 104 received within the housing 102.

Turning now to FIGS. 9-14, additional views of the damper assembly 100 are illustrated. As best shown in FIGS. 10 and 13, the conduit 102 houses a pneumatic cylinder assembly that is operable to selectively extend and retract the bladder 104 from the cylinder. The pneumatic cylinder assembly includes a pneumatic cylinder 124, piston guide 126 and magnetic coupling 128 that are housed within the conduit 102. The pneumatic cylinder 124 is operatively connected to the bladder 104 an is operable to selectively retract and extend the bladder from the conduit housing 102. As also shown therein, the pneumatic cylinder assembly also includes a conical valve 130 and associated retaining spring 132 through which a lifting rod 134 having an lifting eyebolt 136 is provided. An interior, central portion of the bladder 104 is provided with seal rings 138 that seat against the conical valve 130.

As best shown in FIGS. 11 and 12, the conduit 102 also houses a guide bushing 140 that receives therethrough an air supply feed tube 142. In an embodiment, the air supply feed tube 142 is coupled to a supply of pressurized air available at the power plant (e.g., an air compressor) such that the bladder 104 may be inflated utilizing the compressor. In another embodiment, the bladder 104 may be inflated via a dedicated fan located outside the stack 28 on a small platform.

In operation, after a shut down operation is commenced, the pneumatic cylinder may be actuated to selectively extend the bladder 104 from the conduit housing 102. The bladder 104 may then be inflated via the pneumatic connection discussed above (or via a dedicated fan). In particular, in an embodiment, the pneumatic cylinder 124 is actuatable to pull the rod 134 against the bias of the conical spring 136, which allows air to enter the bladder 104 through the valve 130. As air enters the bladder 104, it expands radially until the outer peripheral surface of the bladder 104 contacts the interior sidewalls of the stack 28, creating a generally fluid-tight seal therewith. This seal substantially prevents heat loss from the HRSG through the stack 28 due to natural draft during boiler outage. Accordingly, during restart, the internal components of the HRSG may be at or close to normal operating temperatures, obviating the need to slowly preheat the HRSG prior to operating at fully capacity. In addition, because the temperature within the HRSG is substantially maintained, even during outages, thermal stresses in the components of the HRSG may be minimized.

In connection with the above, upon restart, the bladder 104 may be deflated and the pneumatic cylinder may be actuated to retract the bladder 104 into the cylinder 102, thereby opening the stack 28 and allow exhaust gases to once again exit to atmosphere. Power generation, including operation of the HRSG, may then resume as usual.

In contrast to existing metallic dampers, the damper assembly 100 of the present invention is lightweight and can therefore be easily retrofit into existing HRSG stacks without requiring stack or foundation modification or redesign. In addition, once installed, the damper assembly 100 requires no subsequent assembly, disassembly or maintenance, but can simply be inflated and deflated as desired in response to plant operating modes (i.e., shut down/outage and normal operation). This is in contrast to some existing devices which require installation before each outage or maintenance period, and removal from the stack before every subsequent restart. Furthermore, because the bladder 104 is capable of withstanding temperatures up to and/or in excess of 250° C., the damper may be deployed within a normal cycling mode of the boiler where temperatures may approach 250° C. This is in contrast to existing devices which are not capable of deployment at such temperatures and may only be used in locations or in situations where the environment surrounding such devices has cooled to a substantial degree (e.g., below 100° C.), such as well after a shut down event (e.g., for maintenance).

In an embodiment, one or more tethers may be operatively attached to the bladder 104 in order to facilitate the deflation of the bladder 104. In an embodiment, the bladder 104 may also have drain points or ports that allow rain water or the like to be discharged inside the stack or collected and removed from the stack with dedicated openings. In an embodiment, the pneumatic cylinder and supply of pressurized air may be electrically connected to a control unit such that the bladder may be selectively extended and inflated, and deflated and retracted automatically upon command by a user or technician. For example, the system may be configured such that it may be deployed or retracted upon depression of a button or the like by a technician. In another embodiment, the control unit may be configured to automatically extend and inflate the bladder when a shut down mode is initiated, and to automatically deflate and retract the bladder into the conduit housing when a restart mode is initiated, without specific input by a technician.

The present invention therefore prevents thermal losses through the stack where existing dampers cannot be installed because of structural loading reasons or utilized daily because of cycling operation. Accordingly, the damper assembly of the present invention obviates the need to burn a substantial amount of fuel to get the HRSG back up to temperature, thereby resulting in reduced operating costs, and decreases the time required to have the plant back at full capacity following an outage, such as a night shut down or weekend shut down, thereby increasing the efficiency of power generation, as a whole.

In an embodiment, a damper assembly for minimizing heat loss through an exhaust stack is provided. The damper assembly includes a housing mountable within the stack and a bladder received within the housing. The bladder is selectively movable between a first position in which the bladder is deflated and received within the housing, and second position in which the bladder is positioned outside the housing and inflated such that a peripheral surface of the bladder contacts an interior sidewall of the stack to create a gas seal. In an embodiment, the bladder is disc-shaped when inflated. In an embodiment, as best illustrated in FIG. 14, the bladder is cone-shaped when inflated. In an embodiment, the bladder is configured to be inflated via a pneumatic connection. In an embodiment, the damper assembly includes a pneumatic cylinder within the housing and operatively connected to the bladder, the pneumatic cylinder being selectively actuatable to move the bladder between the first and second positions. In an embodiment, the housing is mounted concentrically within the stack. In an embodiment, the damper assembly may includes a mounting assembly for mounting the housing within the stack. The mounting assembly may include a plurality of supporting legs pivotally connected at one end to the housing and at respective opposite ends to the interior sidewall of the stack via a mounting bracket, and an adjustable strut extending from the housing to each supporting leg. In an embodiment, the exhaust stack forms a part of a heat recovery steam generator. In an embodiment, the bladder is formed from a material configured to withstand temperatures up to approximately 250° C.

In another embodiment, a damper assembly for minimizing heat loss through a stack of a heat recovery steam generator is provided. The damper assembly includes a housing positioned concentrically within the stack, and an inflatable bladder movable between a first position in which the bladder is received within the housing and a second position in which the bladder is extended from the housing. In an embodiment, when in the second position, the bladder is inflated such that a peripheral surface of the bladder contacts an interior sidewall of the stack to create a gas seal to minimize a flow of air from the stack, and when in the first position, the bladder is deflated such that the flow of air is permitted to flow past the housing and exit the stack. In an embodiment, when inflated, the bladder is disc-shaped. In an embodiment, when deflated, the bladder is cone-shaped. In an embodiment, the stack is an exhaust stack at an outlet end of the heat recovery steam generator. In an embodiment, the stack is a bypass stack at an inlet end of the heat recovery steam generator. In an embodiment, the bladder is configured to be inflated via a pneumatic connection. In an embodiment, the damper assembly includes a pneumatic cylinder within the housing and operatively connected to the bladder. The pneumatic cylinder may be selectively actuatable to move the bladder between the first and second positions.

In yet another embodiment, a method for minimizing heat loss through an exhaust stack is provided. The method includes the steps of mounting a damper assembly within the exhaust stack, the damper assembly having a housing and a bladder within the housing, upon entering a shutdown mode, inflating the bladder to establish a gas seal between the bladder and an interior sidewall of the exhaust stack, and upon entering a restart mode, deflating the bladder to enable exhaust gas to pass by the damper assembly within the stack and exit the stack. in an embodiment, the damper assembly is configured to remain in position within the stack during both the shutdown mode and the restart mode. In an embodiment, the step of inflating the bladder is accomplished through a pneumatic connection.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A damper assembly for minimizing heat loss through an exhaust stack, comprising:
   a housing mountable within the stack;
   a bladder received within the housing; and
   a pneumatic cylinder within the housing and operatively connected to the bladder, the pneumatic cylinder being selectively actuatable to move the bladder between the first and second positions;
   wherein the bladder is selectively movable between a first position in which the bladder is deflated and received within the housing, and second position in which the bladder is positioned outside the housing and inflated such that a peripheral surface of the bladder contacts an interior sidewall of the stack to create a gas seal.

2. The damper assembly of claim 1, wherein:
   the bladder is disc-shaped when inflated.

3. The damper assembly of claim 1, wherein:
   the bladder is cone-shaped when inflated.

4. The damper assembly of claim 1, wherein:
   the bladder is configured to be inflated via a pneumatic connection.

5. The damper assembly of claim 1, wherein:
   the housing is mounted concentrically within the stack.

6. The damper assembly of claim 1, further comprising:
   a mounting assembly for mounting the housing within the stack, the mounting assembly including a plurality of supporting legs pivotally connected at one end to the housing and at respective opposite ends to the interior sidewall of the stack via a mounting bracket, and an adjustable strut extending from the housing to each supporting leg.

7. The damper assembly of claim 1, wherein:
   the exhaust stack forms a part of a heat recovery steam generator.

8. The damper assembly of claim 1, wherein:
   the bladder is formed from a material configured to withstand temperatures up to approximately 250° C.

9. A damper assembly for minimizing heat loss through a stack of a heat recovery steam generator, the damper assembly comprising:
   a housing positioned concentrically within the stack; and
   an inflatable bladder movable between a first position in which the bladder is received within the housing and a second position in which the bladder is extended from the housing;

wherein the stack is one of an exhaust stack at an outlet end of the heat recovery steam generator and a bypass stack at an inlet end of the heat recovery steam generator.

10. The damper assembly of claim 9, wherein:

when in the second position, the bladder is inflated such that a peripheral surface of the bladder contacts an interior sidewall of the stack to create a gas seal to minimize a flow of air from the stack; and when in the first position, the bladder is deflated such that the flow of air is permitted to flow past the housing and exit the stack.

11. The damper assembly of claim 10, wherein:

when inflated, the bladder is disc-shaped.

12. The damper assembly of claim 10, wherein:

when deflated, the bladder is cone-shaped.

13. The damper assembly of claim 9, wherein the bladder is configured to be inflated via a pneumatic connection.

14. A damper assembly for minimizing heat loss through a stack of a heat recovery steam generator, the damper assembly comprising:

a housing positioned concentrically within the stack; and an inflatable bladder movable between a first position in which the bladder is received within the housing and a second position in which the bladder is extended from the housing; and a pneumatic cylinder within the housing and operatively connected to the bladder, the pneumatic cylinder being selectively actuatable to move the bladder between the first and second positions.

15. A method for minimizing heat loss through an exhaust stack, comprising the steps of:

mounting a damper assembly within the exhaust stack, the damper assembly having a housing and a bladder within the housing;

upon entering a shutdown mode, inflating the bladder to establish a gas seal between the bladder and an interior sidewall of the exhaust stack; and upon entering a restart mode, deflating the bladder to enable exhaust gas to pass by the damper assembly within the stack and exit the stack.

16. The method according to claim 15, wherein:

the damper assembly is configured to remain in position within the stack during both the shutdown mode and the restart mode.

17. The method according to claim 15, wherein:

the step of inflating the bladder is accomplished through a pneumatic connection.

* * * * *